United States Patent
Mateski et al.

(10) Patent No.: US 8,897,739 B1
(45) Date of Patent: Nov. 25, 2014

(54) DISTRIBUTED ANTENNA SYSTEM THAT PROVIDES INFORMATION FOR A LOCATION BASED ON PSEUDO-NETWORK IDENTIFIERS

(75) Inventors: Christopher J. Mateski, Overland Park, KS (US); Alan Falk, Olathe, KS (US); Darrin Mott, Gardner, KS (US); Julie A. Hart, Raymore, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 513 days.

(21) Appl. No.: 13/212,530

(22) Filed: Aug. 18, 2011

(51) Int. Cl.
*H04M 11/04* (2006.01)

(52) U.S. Cl.
USPC .......... 455/404.1; 455/404.2; 455/456.1; 455/456.2; 455/456.3; 455/456.5; 455/457

(58) Field of Classification Search
USPC .................. 455/404.1, 404.2, 456.1–457
See application file for complete search history.

(56) References Cited

U.S. PATENT DOCUMENTS

| | | | |
|---|---|---|---|
| 7,538,666 B2 * | 5/2009 | Campman | 340/539.13 |
| 7,812,766 B2 | 10/2010 | Leblanc et al. | |
| 7,860,518 B2 | 12/2010 | Flanagan et al. | |
| 2003/0222819 A1 | 12/2003 | Karr et al. | |
| 2005/0143091 A1 | 6/2005 | Shapira et al. | |
| 2008/0194226 A1 | 8/2008 | Rivas et al. | |
| 2009/0137255 A1 * | 5/2009 | Ashley et al. | 455/456.1 |
| 2010/0234045 A1 | 9/2010 | Karr et al. | |
| 2010/0298008 A1 | 11/2010 | Burroughs | |
| 2011/0059718 A1 * | 3/2011 | Wang et al. | 455/404.1 |

\* cited by examiner

*Primary Examiner* — Charles Appiah
*Assistant Examiner* — Jaime Holliday

(57) ABSTRACT

A distributed antenna system wirelessly receives an overhead signal having a network identifier. The antenna system replaces the network identifier with a first pseudo-network identifier and with a second pseudo-network identifier. The antenna system wirelessly transmits the network overhead signal having the first pseudo-network identifier from a first coverage antenna at a first location. The first pseudo-network identifier is associated with first information associated with the first location. The antenna system wirelessly transmits the network overhead signal having the second pseudo-network identifier from a second coverage antenna at a second location. The second pseudo-network identifier is associated with second information associated with the second location. User communication devices may receive and translate the pseudo-network identifiers into the information for their respective location.

18 Claims, 6 Drawing Sheets

DISTRIBUTED ANTENNA SYSTEM THAT PROVIDES INFORMATION FOR A LOCATION BASED ON PSEUDO-NETWORK IDENTIFIERS

TECHNICAL BACKGROUND

A distributed antenna system extends the range of wireless communications with a network base station to areas that the network base station cannot adequately reach. In a typical configuration, the distributed antenna system receives wireless signals from the network base station into a base antenna system. The base antenna system produces stronger and cleaner versions of the received signal and transfers these cleaned-up versions to a set of coverage antenna systems. The coverage antenna systems are typically located in areas that may be too distant from the network base station or that are shielded from the network base station by structural materials. The coverage antenna systems wirelessly transfer their respective signals to user communication devices at the respective locations.

In a reciprocal fashion, the coverage antenna systems receive wireless signals from the user communication devices and transfer these signals to the base antenna system. The base antenna system wirelessly transfers these signals to the network base station. Thus, the distributed antenna system operates as a two-way wireless repeater between the user communication devices and the network base station.

The network base station wirelessly broadcasts overhead signals to enable user communication devices to communicate with the base station. In a distributed antenna system scenario, the base antenna system receives the overhead signals from the network base station and the coverage antennas wirelessly re-broadcast the overhead signals to the user communication devices. The overhead signals carry various information including a network identifier and a system identifier. The network identifier is associated with an entire network of base stations and associated network equipment. The system identifier identifies the individual base station. Thus, the network identifier and the system identifier enable user communication devices to readily identify the various networks and base stations that they encounter. In some implementations, the user communication devices process a pilot signal and the system identifier to identify the various networks and base stations, and the network identifier is not used for this purpose.

OVERVIEW

A distributed antenna system wirelessly receives an overhead signal having a network identifier. The antenna system replaces the network identifier with a first pseudo-network identifier and with a second pseudo-network identifier. The antenna system wirelessly transmits the network overhead signal having the first pseudo-network identifier from a first coverage antenna at a first location. The first pseudo-network identifier is associated with first information associated with the first location. The antenna system wirelessly transmits the network overhead signal having the second pseudo-network identifier from a second coverage antenna at a second location. The second pseudo-network identifier is associated with second information associated with the second location. User communication devices may receive and translate the pseudo-network identifiers into the information for their respective locations.

DETAILED DESCRIPTION

Figure 1:
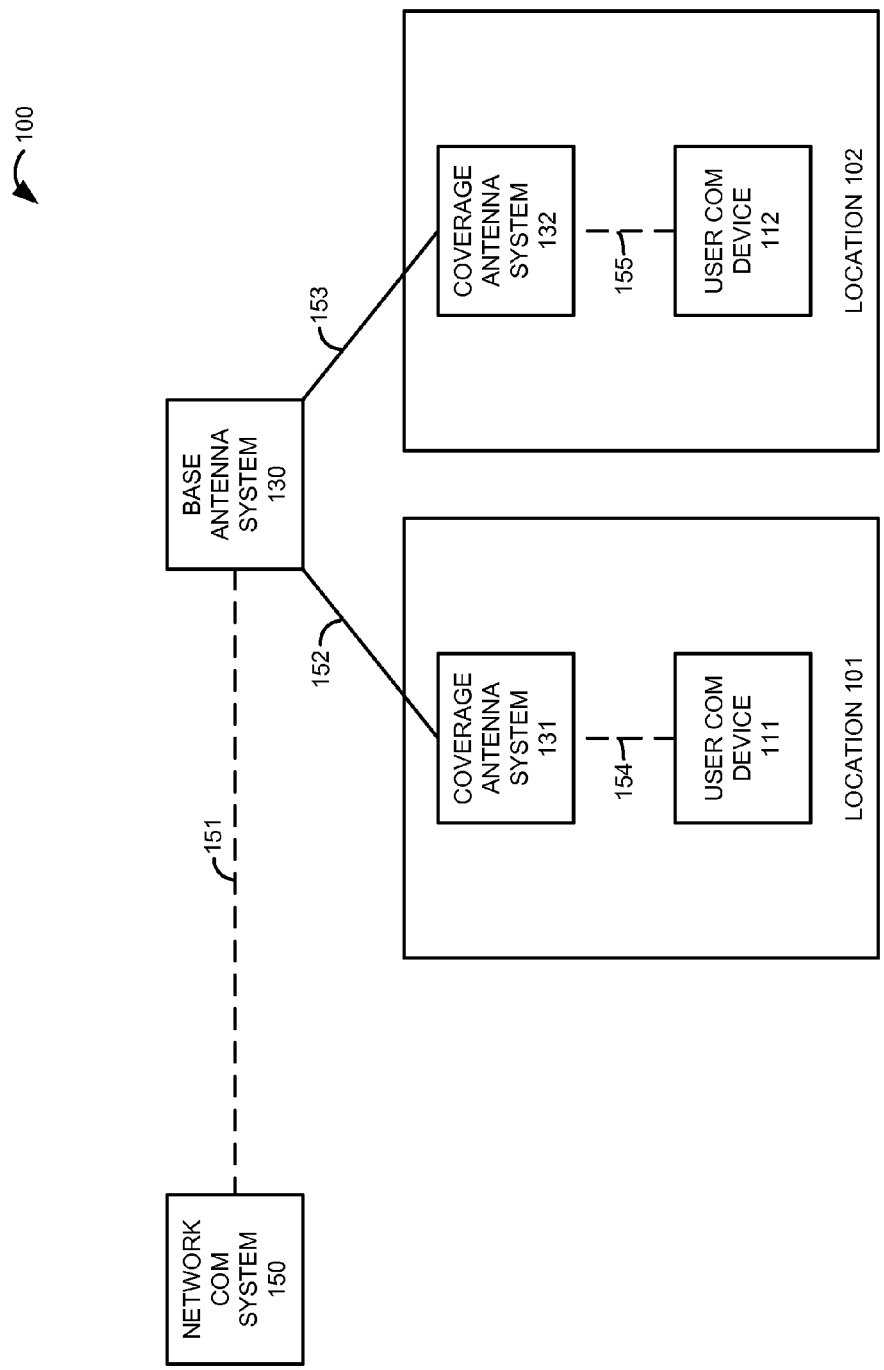
FIG. 1 illustrates a distributed antenna system that transmits pseudo-network identifiers to help user communication devices obtain information pertinent to their location.

FIG. 1 illustrates distributed antenna system 100 that transmits pseudo-network identifiers to help user communication devices 111-112 obtain information pertinent to their respective locations 101-102. Distributed antenna system 100 comprises base antenna system 130, coverage antenna systems 131-132, and user communication devices 111-112. User communication devices 111-112 could be phones, computers, internet appliances, machine transceivers, and the like. Antenna systems 130-132 comprise antenna elements, communication circuitry, memory, software, user interfaces, and possibly additional communication equipment. Base antenna system 130 and coverage antenna system 131 exchange communication signals over system link 152. Base antenna system 130 and coverage antenna system 132 exchange communication signals over system link 153. System links 152-153 comprise optical fibers, coaxial cabling, air interfaces, add/drop components, and the like.

Coverage antenna system 131 and user communication device 111 are physically present at location 101. Coverage antenna system 132 and user communication device 112 are physically present at location 102. Locations 101-102 have geographical boundaries that are mutually exclusive. In some examples, locations 101-102 comprise different portions of a building, such as different floors. In other examples, locations 101-102 comprise different buildings at a site. In yet other examples, locations 101-102 comprise different building/floor combinations at a campus. Other types of precise location information could be associated with locations 101-102, such as geographic coordinates indicating the proximal latitude, longitude, and elevation of the location.

Network communication system 150 comprises a wireless access node in a wide area communication network that has an associated network identifier. Network communication system 150 and base antenna system 130 communicate over wireless network link 151. Network communication system 150 wirelessly broadcasts a pilot signal and other overhead signals to enable user communication devices 111-112 to acquire the network. Base antenna system 130 wirelessly receives these overhead signals from network communication system 150 over link 151. Base antenna system 130 transfers the overhead signals to coverage antenna systems 131-132 over system links 152-153.

Coverage antenna system 131 wirelessly transfers the overhead signals to user communication device 111 over wireless link 154. Coverage antenna system 132 wirelessly transfers the overhead signals to user communication device 112 over wireless link 155. User communication devices 111-112 receive and process the overhead signals to access communication services from network communication system 150.

The overhead signals received by base station system 130 include the network identifier for the communication network that includes network communication system 150. In some modes of operation, the network identifier from network communication system 150 is transferred to user communication devices 111-112 over links 154-155. In other modes of operation, distributed antenna system 100 replaces the network identifier from network communication system 150 with a pseudo-network identifier in the overhead signals delivered to a given location.

The overhead signals on wireless link 154 to user communication device 111 at location 101 may include a pseudo-network identifier, but the overhead signals on wireless link 155 to user communication device 112 at location 102 may still have the network identifier from network communication system 150. The pseudo-network identifier broadcast at location 101 may be pre-correlated to specific information within user communication device 111. Thus, distributed antenna system 100 distributes the specific information at a given location by transmitting the pseudo-network identifier for the specific information at that location.

Consider an example where location 102 is the $34^{th}$ floor of a high-rise building, and where a pseudo-network identifier is correlated to the information "evacuate the $34^{th}$ floor due to fire." If there is a fire on the $34^{th}$ floor (location 102), then distributed antenna system 100 replaces the network identifier from network communication system 150 with the pseudo-network identifier correlated to the fire and evacuation information for the overhead signals to coverage antenna system 132. Coverage antenna system 132 then wirelessly broadcasts the pseudo-network identifier in the overhead signals at location 102. User communication device 112 receives the pseudo-network identifier over wireless link 155, and in response, translates the pseudo-network identifier into the correlated information, and presents the information to the user. Thus, user communication device 112 might beep, flash lights, and display "EVACUATE THE $34^{th}$ FLOOR DUE TO FIRE."

Various techniques could be used to add the pseudo-network identifier to the overhead signals. Base antenna system 130 could replace the received network identifier with the pseudo-network identifier in the specific overhead signal regenerated for a specific coverage antenna at a specific location. Alternatively, coverage antenna systems 111-112 could replace the received network identifier with the pseudo-network identifier in the specific overhead signal broadcast at their own location. Note that antenna systems 130-132 could also add the pseudo-network identifier to the overhead signal along with the received network identifier, and as a result, wirelessly transfer both network identifiers.

The correlated information for a location may come from various sources. An alarm system might detect a condition at a specific location, such a fire, contamination, or some other emergency. The alarm system would responsively transfer an alarm message for the location to distributed antenna system 100. In response, distributed antenna system 100 would select a pseudo-network identifier correlated to the alarm message and one or more coverage antenna systems that serve the specific location. Distributed antenna system 100 would then wirelessly broadcast the pseudo-network identifier for the alarm from the coverage antenna(s) that serve the specific location.

In another example, an operator system could transfer an information instruction for a location to distributed antenna system 100. If a dangerous chemical leak occurs near the location, then the operator instruction might be "stay inside at the current location"—a lock-down order. In response, distributed antenna system 100 would select a pseudo-network identifier correlated to the operator instruction and one or more coverage antenna systems that serve the location. Distributed antenna system 100 would then wirelessly broadcast the pseudo-network identifier for the lock-down order from the coverage antenna system(s) that serve the location.

The information provided by distributed antenna system 100 in the above examples is rather serious, such as building evacuations due to fire and lock-downs due to contamination. In other examples, the information could be less serious and changed more readily. By frequently updating user communication devices 111-112 with new information/identifier correlations and by broadcasting the various pseudo-network identifiers, a broad array of data could be provided to user communication devices 111-112.

In some examples, user communication devices 111-112 report their respective pseudo-network identifiers to an external system that performs information translations. For example, user device 112 might report a received pseudo-network identifier to a position determination system coupled to network communication system 150. The position determination system then translates the pseudo-network identifier into location information for location 102. The location information might be geographic coordinates, physical address, building and floor, or some other data that is correlated to the pseudo-network identifier received at location 102. The position determination system then transfers the precise location information to user communication device 112 or to some other system.

Figure 2:
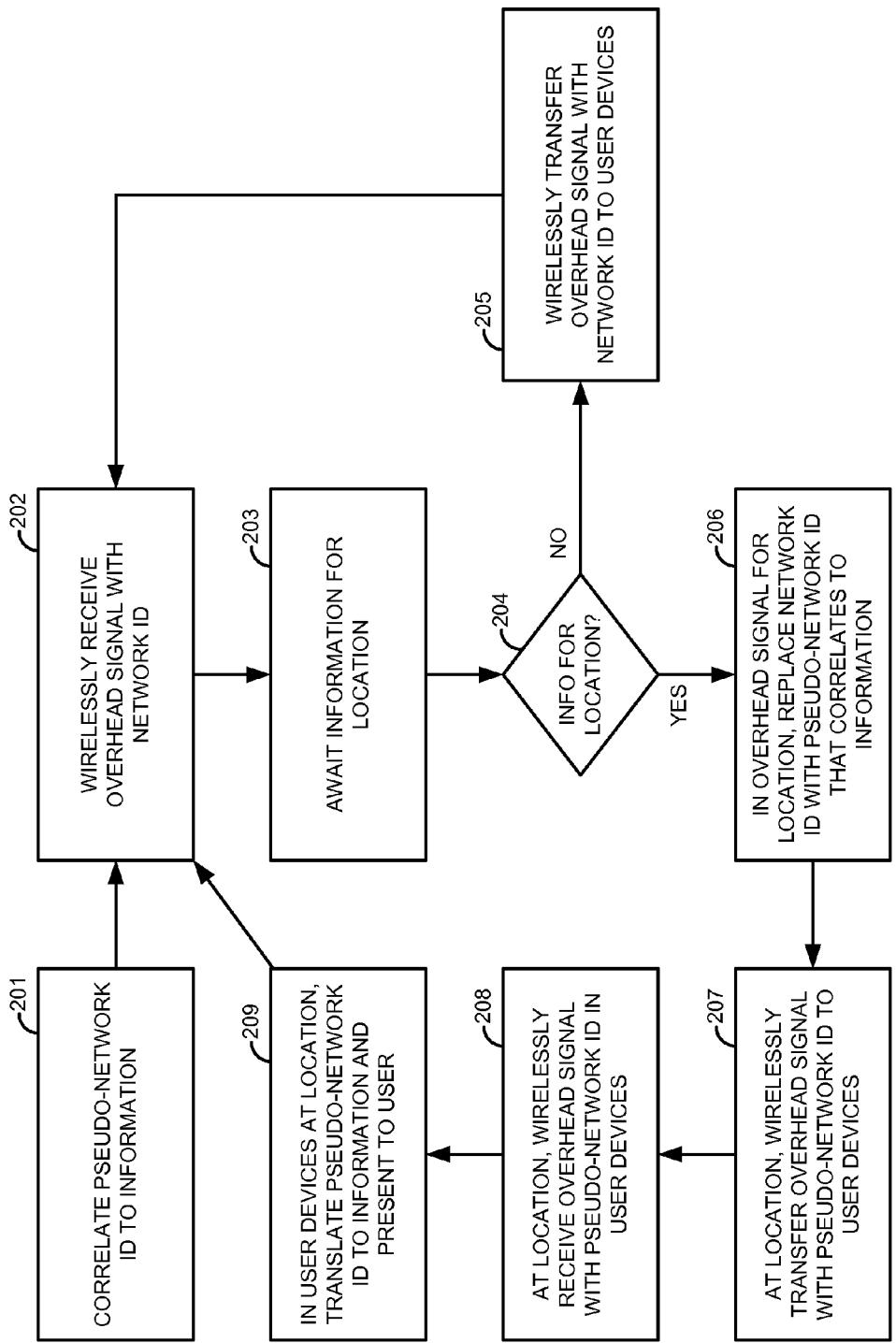
FIG. 2 illustrates the operation of a distributed antenna system to use pseudo-network identifiers to provide users with information about their location.

FIG. 2 illustrates the operation of distributed antenna system 100 and user communication device 111 to use pseudo-network identifiers to provide users with information about their location. The operation begins by correlating pseudo-network identifiers to information (201), such as correlating network identifier "1012" with the information "radioactive contamination detected in storage facility X." The information and correlations are provided to user communication devices and/or external translation systems as needed. Distributed antenna system 100 then wirelessly receives overhead signals with a network identifier (202) and awaits for information for a location (203).

If no information is received for a location (204), then distributed antenna system 100 wirelessly transfers the overhead signals with the received network identifier to the locations (205). If information is received for a location (204), then in the overhead signals for that location, distributed antenna system 100 replaces the network identifier with the pseudo-network identifier correlated to the information (206). Distributed antenna system 100 wirelessly transfers the pseudo-network identifier in the overhead signals from coverage antennas at the location (207).

User communication devices at the location wirelessly receive the pseudo-network identifier in the overhead signals (208). The user communication devices translate the pseudo-network identifier into the information—possibly by accessing an external system to assist with the translation—and present the information to the user (209). In this example, the user communication devices would operate normally if the actual network identifier is received, but the user devices would present the information "radioactive contamination detected in storage facility X" if they receive the pseudo-network identifier "1012." Thus, distributed antenna system 100 would wirelessly broadcast the pseudo-network identifier "1012" from the coverage antenna in storage facility X if a contamination alarm is received for storage facility X.

Figure 3:
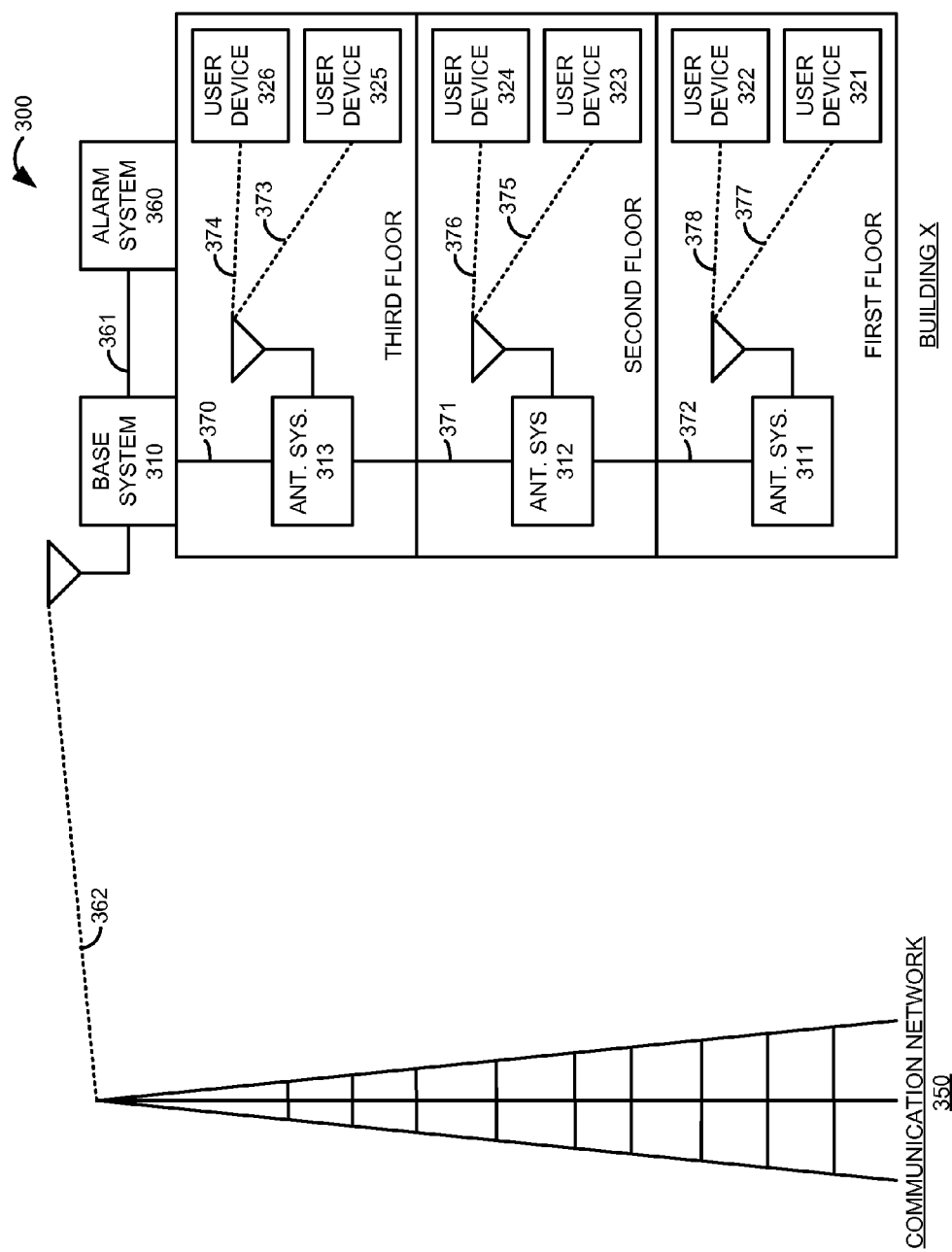
FIG. 3 illustrates a distributed antenna system that helps user communication devices provide various alarms specific to their building and floor.

FIG. 3 illustrates distributed antenna system 300 that helps user communication devices 321-326 provide various alarms specific to their building and floor. Distributed antenna system 300 comprises: base antenna system 310, coverage antenna systems 311-313, and user communication devices 321-326. Base antenna system 310 is located on the top of Building X (although portions of system 310 may be more protected within the building). Coverage antenna system 313 and user communication devices 325-326 are located on the third floor of Building X. Coverage antenna system 312 and user communication devices 323-324 are located on the second floor of Building X. Coverage antenna system 311 and user communication devices 321-322 are located on the first floor of Building X. Although not shown, additional buildings could be equipped and operate in a similar manner.

Alarm system 360 and base antenna system 310 communicate over local area network link 361. Communication network 350 and base antenna system 310 communicate over wireless network link 362. Base antenna system 310 and coverage antenna system 313 communicate over optical link 370. Base antenna system 310 and coverage antenna system 312 communicate over optical links 370-371. Base antenna system 310 and coverage antenna system 311 communicate over optical links 370-372. Coverage antenna system 311 and user communication devices 321-322 communicate over respective wireless links 377-378. Coverage antenna system 312 and user communication devices 323-324 communicate over respective wireless links 375-376. Coverage antenna system 313 and user communication devices 325-326 communicate over respective wireless links 373-374.

Figure 4:
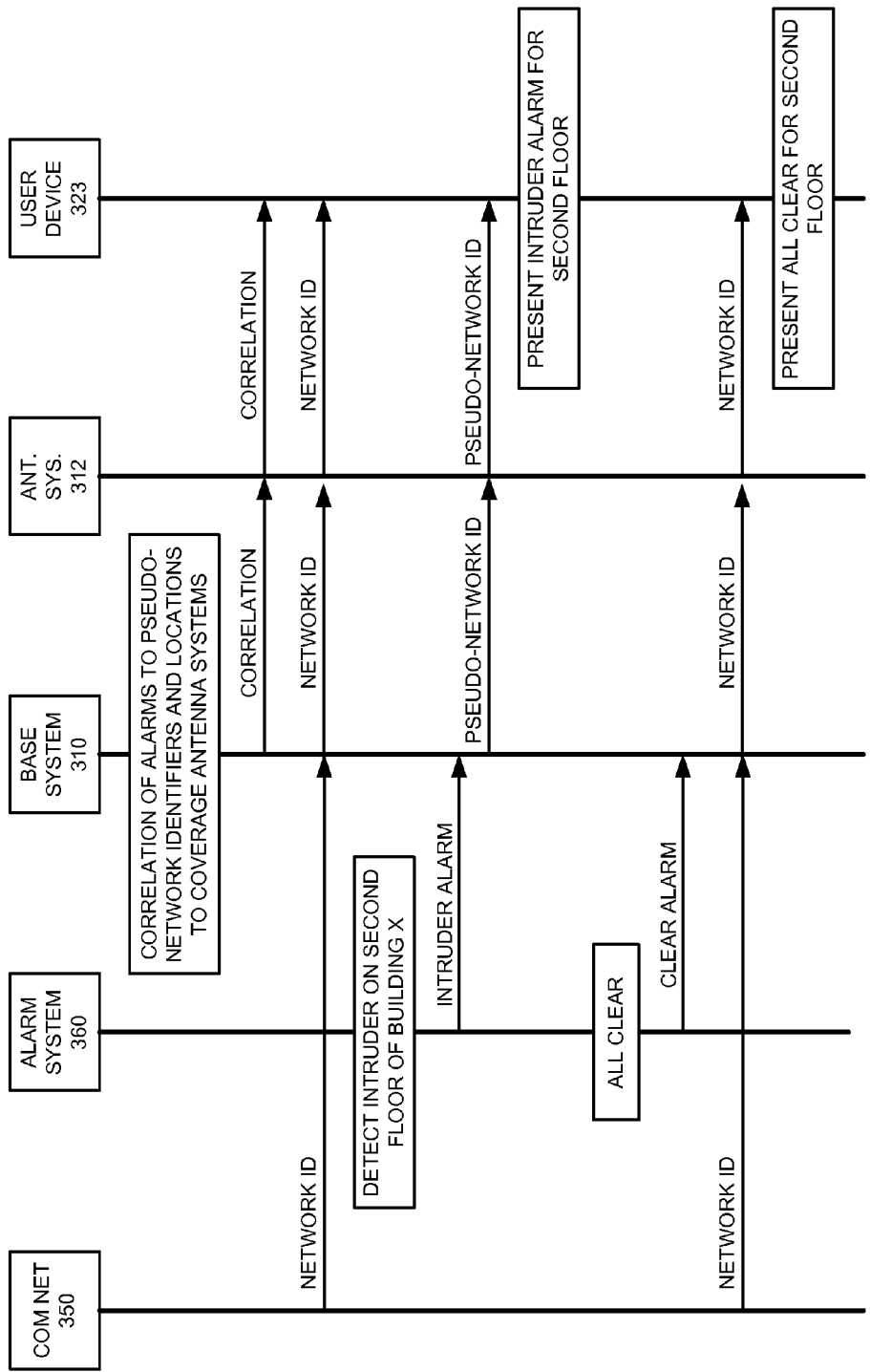
FIG. 4 illustrates the operation of a distributed antenna system to help a user communication device provide various alarms for a specific floor of a specific building.

FIG. 4 illustrates the operation of distributed antenna system 300 to help user communication device 323 provide various alarms for the second floor of building X. Note that some coverage antenna systems and user communication devices on FIG. 3 are not shown on FIG. 4, but their operation would be similar to that shown. Base station system 310 receives correlations of alarms to pseudo-network identifiers and correlations of locations to coverage antenna systems. The correlations of the alarms to the pseudo-network identifiers are provided to the user communication devices—including user communication device 323 through coverage antenna system 312.

Communication network 350 wirelessly transfers overhead signals including its network identifier to enable user communication devices to acquire the network. Base antenna system 310 receives the overhead signal with the network identifier. Base antenna system 310 converts the wireless overhead signal into an optical overhead signal and transfers the optical overhead signal with the network identifier to coverage antenna system 312. Coverage antenna system 312 converts the optical overhead signal to a wireless overhead signal and wirelessly transmits the wireless overhead signal with the network identifier. User communication device 323 wirelessly receives the overhead signal with the network identifier for network 350, and as a result, device 323 operates normally.

At this point, alarm system 360 detects an intruder on the second floor of building X. Alarm system 360 transfers an intruder alarm for the second floor of building X to base antenna system 310. Base antenna system 310 identifies coverage antenna system 312 for the second floor of building X and generates an optical overhead signal that has a pseudo-network identifier for an intruder alarm. Base antenna system 310 transfers the optical overhead signal that has the pseudo-network identifier to coverage antenna 312. Coverage antenna 312 wirelessly transfers the overhead signal with the pseudo-network identifier to user communication device 323. User communication device 323 detects and translates the pseudo-network identifier into the correlated intruder alarm information. User communication device 323 then presents an intruder alarm for the second floor of building X to the user.

Eventually, alarm system 360 clears the intruder alarm and transfers an all-clear for the alarm to base antenna system 310. Base antenna system 310 continues to receive the overhead signal with the network identifier from communication network 350. Base antenna system 310 converts the wireless overhead signal into an optical overhead signal and transfers the optical overhead signal with the network identifier for network 350 to coverage antenna system 312. Coverage antenna system 312 converts the optical overhead signal to a wireless overhead signal and wirelessly transmits the wireless overhead signal with the network identifier. User communication device 323 wirelessly receives the overhead signal and responsive to the actual network identifier for network 350, device 323 presents an all-clear message to the user and operates normally.

Figure 5:
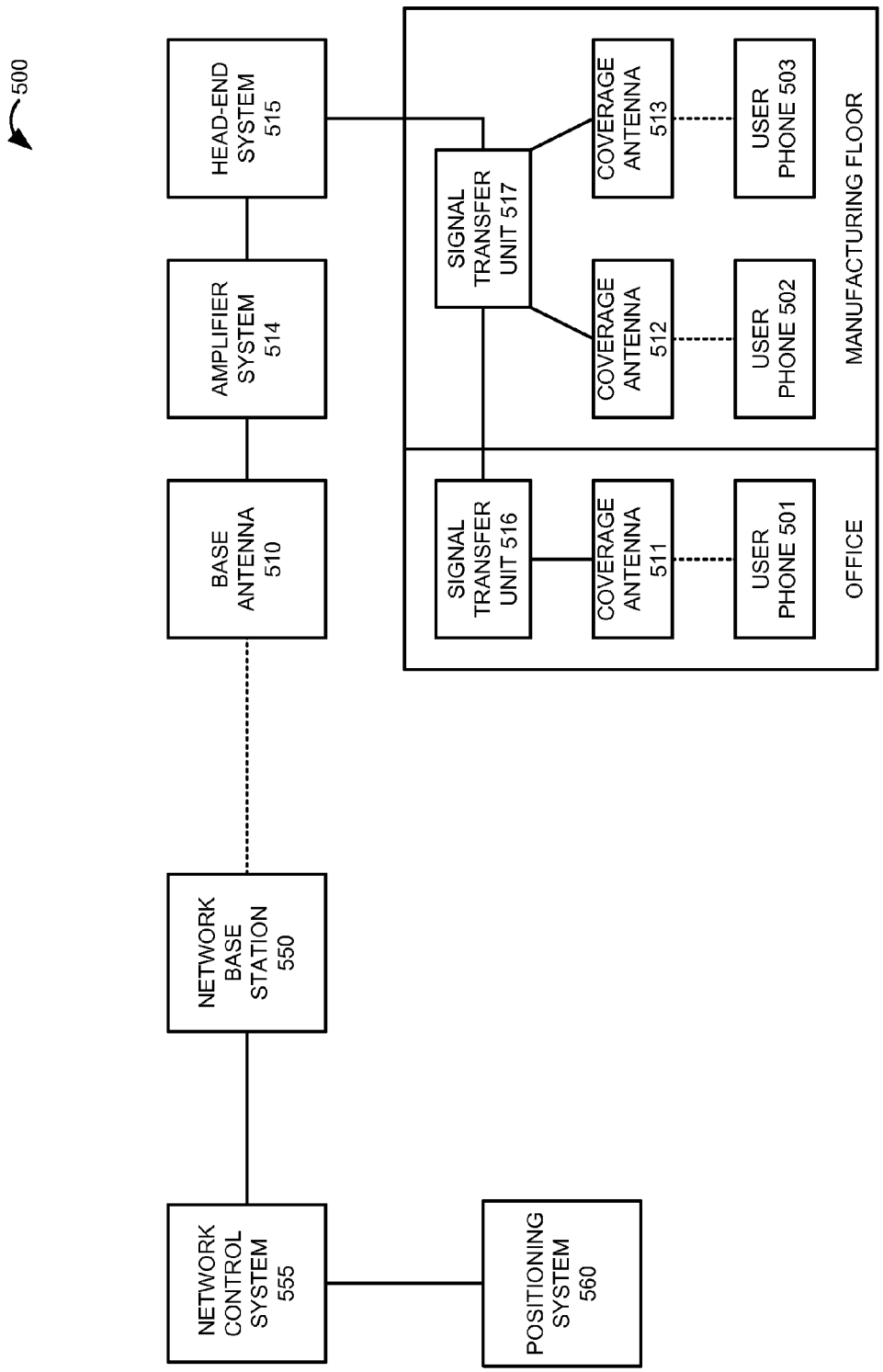
FIG. 5 illustrates a distributed antenna system that helps user phones determine their specific location at an industrial site.

FIG. 5 illustrates distributed antenna system 500 that helps user phones 501-503 determine their specific location at an industrial site. Distributed antenna system 500 comprises base antenna 510, amplifier system 514, head-end system 515, signal transfer units 516-517, and coverage antennas 511-513.

Base antenna 510 receives an overhead signal with a network identifier from network base station 550 and transfers the overhead signal to amplifier system 514 which is co-located with the base antenna 510 on a tower. Amplifier system 514 transfers an amplified overhead signal to head-end system 515 which is located in a protected area. Head-end system 515 re-generates individual versions of the overhead signal for coverage antennas 511-513. In particular, head-end system 515 replaces the network identifier in the received overhead signal with pseudo-network identifiers that are correlated to locations at the site. Head-end system 515 distributes the re-generated versions of the overhead signal to the appropriate coverage antenna systems through signal transfer units 516-517 that perform drop and insert operations. Thus, each one of coverage antennas 511-513 receives its own re-generated overhead signal with a pseudo-network identifier for its own location. Coverage antennas 511-513 wirelessly broadcast their overhead signals with their own pseudo-network identifiers to user phones 501-503.

User phones 501-503 are configured with the pseudo-network identifiers in their list of access networks. Periodically, user phones 501-503 use their list to attempt to obtain communication access. User phones 501-503 will scan and note overhead signal information that they receive in this process. When communication access is obtained, phones 501-503 transfer their record of overhead signal information to positioning system 560 over distributed antenna system 500, base station 550, and network control system 555. Positioning system 560 processes the overhead signal records to identify the current pseudo-network identifiers for each phone. Based on based on its stored correlations, positioning system 560 translates the identified pseudo-network identifiers into the precise locations, such as the specific office area or manufacturing floor. Positioning system 560 then transfers the precise location to each phone.

Figure 6:
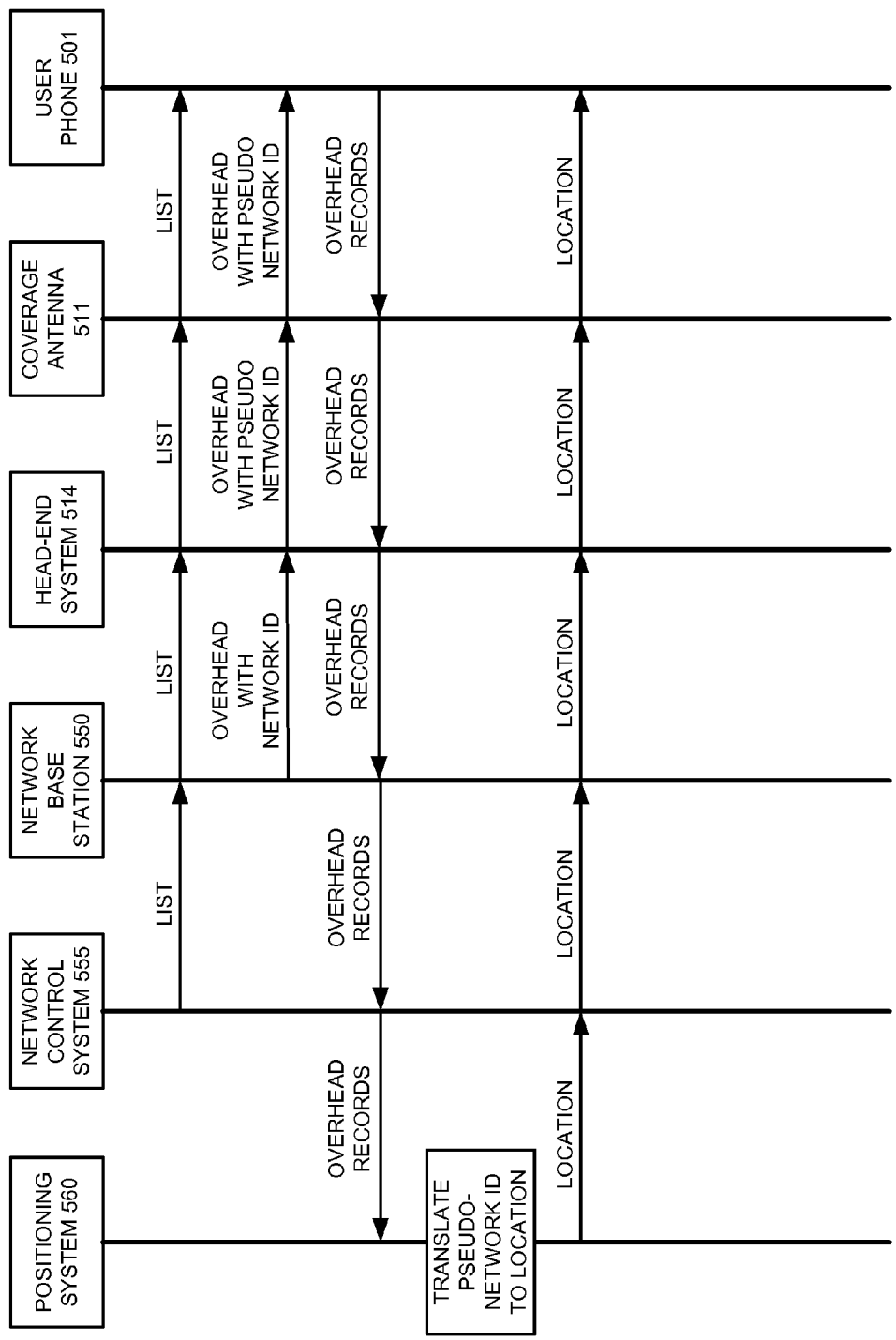
FIG. 6 illustrates the operation of a distributed antenna system to help user phones determine their specific location at an industrial site.

FIG. 6 illustrates the operation of distributed antenna system 500 to help user phone 501 determine its specific location at an industrial site. Network control system 555 transfers a prioritized network list to user phone 501, and phone 501 uses the list for network access. The list has pseudo-network identifiers that are correlated to various locations at the site.

Network base station 550 wirelessly broadcasts an overhead signal which is processed by head-end system 515. Head-end system 515 re-generates the overhead signal for each coverage antenna and adds the appropriate pseudo-network identifier for each coverage antenna based on the correlation of pseudo-network identifier, location, and coverage antenna. Thus, coverage antennas 511-513 each receive the their own pseudo-network identifier for their own location in the re-generated overhead signals. Coverage antenna 511 receives the pseudo-network identifier for the office location. Coverage antenna 511 wirelessly broadcasts the overhead signal with the pseudo-network identifier for the office location.

Based on its list from network control system 555, user phone 501 receives the overhead signal from coverage antenna 511. Once communication access is gained, user phone 501 transfers its overhead signal record indicating the pseudo-network identifier to positioning system 560. Phone 501 may transfer other data, such as GPS data and pilot signal information. Positioning system 560 processes the overhead records and other information to determine location. Since the records indicate that the pseudo-network identifier for the office location is the current network identifier for user phone 501, then positioning system 560 can readily determine that phone 501 is at the office location by translating the pseudo-network identifier into the specific office location based on the stored correlations. Positioning system 560 transfers location information indicating the specific office location to user phone 501.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a distributed antenna system, the method comprising:
   wirelessly receiving a network overhead signal having a network identifier into a base antenna system and transferring the network overhead signal to a first coverage antenna system and to a second coverage antenna system;
   replacing the network identifier with a first pseudo-network identifier and with a second pseudo-network identifier;
   wirelessly transmitting the network overhead signal having the first pseudo-network identifier from the first coverage antenna system, wherein the first pseudo-network identifier is associated with first information associated with a first location;
   wirelessly transmitting the network overhead signal and the second pseudo-network identifier from the second coverage antenna system, wherein the second pseudo-network identifier is associated with second information associated with a second location; and
   further comprising:
   receiving an operator instruction associated with the first location;
   translating the operator instruction into the first pseudo-network identifier; and
   wherein wirelessly transmitting the network overhead signal having the first pseudo-network identifier comprises wirelessly transmitting the network overhead signal having the first pseudo-network identifier in response to the operator instruction.

2. The method of claim 1 further comprising:
   in a first user communication device, wirelessly receiving the network overhead signal having the first pseudo-network identifier, translating the first pseudo-network identifier into the first information associated with the first location, and notifying a first user of the first information associated with the first location;
   in a second user communication device, wirelessly receiving the network overhead signal having the second pseudo-network identifier, translating the second pseudo-network identifier into the second information associated with the second location, and notifying a second user of the second information associated with the second location.

3. The method of claim 1 wherein the operator instruction comprises an instruction to evacuate the first location.

4. The method of claim 1 wherein the operator instruction indicates an emergency condition at the first location.

5. The method of claim 1 further comprising:
   receiving an automatic alarm associated with the first location;
   translating the automatic alarm into the first pseudo-network identifier; and wherein
   wirelessly transmitting the network overhead signal having the first pseudo-network identifier comprises wirelessly transmitting the network overhead signal having the first pseudo-network identifier in response to the automatic alarm.

6. The method of claim 5 wherein the automatic alarm indicates a fire at the first location.

7. The method of claim 5 wherein the automatic alarm indicates a contamination at the first location.

8. The method of claim 1 wherein:
   the first information indicates a first portion of a building;
   the second information indicates a second portion of the building; and
   the first portion of the building and the second portion of the building are mutually exclusive.

9. The method of claim 1 wherein the first information comprises a first building and floor combination and the second information comprises a second building and floor combination.

10. A distributed antenna system comprising:
    a base antenna system configured to wirelessly receive a network overhead signal having a network identifier, re-generate a first overhead signal with a first pseudo-network identifier replacing the network identifier, re-generate a second overhead signal with a second pseudo-network identifier replacing the network identifier, transfer the first overhead signal to a first coverage antenna system, and transfer the second overhead signal to a second coverage antenna system;
    the first coverage antenna system configured to wirelessly transfer the first overhead signal having the first pseudo-network identifier, wherein the first pseudo-network identifier is associated with first information associated with a first location;

the second coverage antenna system configured to wirelessly transfer the second overhead signal having the second pseudo-network identifier, wherein the second pseudo-network identifier is associated with second information associated with a second location, wherein the base antenna system is configured to receive an operator instruction associated with the first location, translate the operator instruction into the first pseudo-network identifier, and regenerate the first overhead signal with the first pseudo-network identifier responsive to the operator instruction.

11. The distributed antenna system of claim 10 further comprising:
- a first user communication device configured to wirelessly receive the first overhead signal having the first pseudo-network identifier, translate the first pseudo-network identifier into the first information associated with the first location, and notify a first user of the first information associated with the first location;
- a second user communication device configured to wirelessly receive the second overhead signal having the second pseudo-network identifier, translate the second pseudo-network identifier into the second information associated with the second location, and notify a second user of the second information associated with the second location.

12. The distributed antenna system of claim 10 wherein the operator instruction comprises an instruction to evacuate the first location.

13. The distributed antenna system of claim 10 wherein the operator instruction indicates an emergency condition at the first location.

14. The distributed antenna system of claim 10 wherein the base antenna system is configured to receive an automatic alarm associated with the first location, translate the automatic alarm into the first pseudo-network identifier, and regenerate the first overhead signal with the first pseudo-network identifier responsive to the automatic alarm.

15. The distributed antenna system of claim 14 wherein the automatic alarm indicates a fire at the first location.

16. The distributed antenna system of claim 15 wherein the automatic alarm indicates a contamination at the first location.

17. The distributed antenna system of claim 10 wherein:
the first information indicates a first portion of a building;
the second information indicates a second portion of the building; and
the first portion of the building and the second portion of the building are mutually exclusive.

18. The distributed antenna system of claim 10 wherein the first information comprises a first building and floor combination and the second information comprises a second building and floor combination.

* * * * *